United States Patent [19]

Kimbrough et al.

[11] Patent Number: 4,794,232
[45] Date of Patent: Dec. 27, 1988

[54] CONTROL FOR GAS METAL ARC WELDING SYSTEM

[75] Inventors: Andrew G. Kimbrough; Timothy A. Ferris, both of Simi Valley, Calif.

[73] Assignee: Kinetic Energy Corporation, Rancho Cordova, Calif.

[21] Appl. No.: 908,279

[22] Filed: Sep. 17, 1986

[51] Int. Cl.⁴ .............................................. B23K 9/09
[52] U.S. Cl. ........................... 219/130.51; 219/124.02; 219/130.33; 219/137.71
[58] Field of Search .................... 219/130.51, 137 PS, 219/137.71, 130.33, 130.21, 124.02

[56] References Cited

U.S. PATENT DOCUMENTS

| 3,538,376 | 11/1970 | Parker | 219/137.71 |
| 4,301,355 | 11/1981 | Kimbrough et al. | 219/137.71 |
| 4,409,465 | 10/1983 | Yamamoto et al. | 219/137 PS |
| 4,427,874 | 1/1984 | Tabata et al. | 219/130.51 |
| 4,620,082 | 10/1986 | Graville et al. | 219/130.51 |
| 4,631,385 | 12/1986 | Rothermel | 219/137.71 |

Primary Examiner—Clifford C. Shaw
Attorney, Agent, or Firm—Wood,Dalton,Phillips,Mason & Rowe

[57] ABSTRACT

An arc welder control in which the current is pulsed between a high level and a low level. The high level pulse is maintained until a selected energy condition is satisfied. The low level pulse is maintained to satisfy an average energy condition. A proximity control moves the torch head and the feed wire tip toward and away from the work to stabilize a parameter of welder operation which may deviate with the current pulse energy control.

18 Claims, 4 Drawing Sheets

CONTROL FOR GAS METAL ARC WELDING SYSTEM

TECHNICAL FIELD

The present invention relates to a control for an arc welder and, more particularly, to a control which optimally maintains arc stability.

INCORPORATION BY REFERENCE

This specification hereby incorporates by reference Kimbrough et al, U.S. Pat. No. 4,301,355 entitled "Gas Metal Arc Welding System".

BACKGROUND ART

In typical arc welding systems, for example for welding two sections of pipe together, a carriage is circumferentially mounted on one of the pipes, and a torch head moves along the carriage, circumferentially welding the pipes. A power supply generates a current which is conducted through a contact tip located within the torch head, to a feed wire electrode, across a gap, through the pipe and ultimately to ground.

As the current flows across the gap, an arc is created, establishing an arc voltage across the gap. The linear distance between the tip of the feed wire electrode and the work is generally referred to as "arc length". The feed wire electrode is continuously fed through the torch head towards the work, and the tip of the feed wire electrode continuously melts due to an intense heat generated by the arc. As the tip of the feed wire electrode melts, the molten metal is deposited on the work as filler metal.

A preferable mode of depositing the metal on the work is known as "spray transfer". The spray transfer mode of metal deposition results in molten metal particles being ejected from the melting tip of the feed wire electrode as the feed wire electrode is being fed towards the work. The ejected particles are transferred across the arc towards the work, where the particles are received by a molten puddle formed in the work.

The size of the molten puddle must be properly controlled or it can become too large to maintain control of the process, especially in out of position welding where gravity causes the puddle to flow. For a thorough discussion of spray transfer, see Kimbrough et al, U.S. Pat. No. 4,301,355 entitled "Gas Metal Arc Welding System", which has been incorporated by reference.

The size of the molten puddle has typically been controlled by pulsing the power alternately at a peak level and a base level. When the power is at the peak level, spray transfer occurs. When the power is at the base level, the arc is maintained, but the spray transfer is minimized, thereby allowing the molten puddle to chill and solidify.

Kimbrough et al '355 discloses a control system wherein the power is pulsed at a variable frequency and variable duty cycle. However, according to Kimbrough et al '355, any disturbances, such as a misaligned carriage, a jarring of the torch head relative to the pipe or a deformity on the pipe, will reduce the arc length and resultingly reduce the arc voltage. The rate at which the tip of the feed wire electrode melts, or wire burn-off rate, is proportional to the power delivered. Because the power delivered is directly proportional to the arc voltage, the reduction in the arc voltage reduces the wire burn-off rate. The reduction in the wire burn-off rate reduces the arc length, further reducing the arc voltage, and compounding the problem. Ultimately the tip of the feed wire electrode contacts the work, extinguishing the arc.

SUMMARY OF THE PRESENT INVENTION

In accordance with the present invention, the time period of the peak level is regulated to deliver a desired energy level. The time period of the base level is determined according to a particular mode of operation selected.

According to a first mode of the invention, the Constant Current/Constant Voltage/On-Demand Wire or CC/CV/ODW mode, the period of the base level is modulated to maintain a desired average current, wherein the average current is calculated over both the preceding peak period and the present base period. A desired arc voltage is maintained by modulating the feed rate of the feed wire electrode and, hence, the arc length.

According to a second mode of the invention, the Constant Voltage/Constant Wire/On-Demand Current or CV/CW/ODC mode, the period of the base level is modulated to maintain a desired average voltage level calculated over both the preceding peak period and the present base period. The feed rate is maintained at a desired level by modulating the current delivered.

According to a third mode of the invention, the Constant Voltage/Constant Current/On-Demand Wire or CV/CC/ODW mode, the period of the base level is modulated to maintain a desired average arc voltage, wherein the average arc voltage is calculated over both the preceding peak period and the present base period. The current is maintained at a desired level by modulating the feed rate of the feed wire electrode.

In each of the three modes of the present invention, one parameter in each particular mode deviates from a desired level to maintain the other parameters at their desired levels. To return the deviating parameter to its desired level, the distance between the torch head and the work, or proximity distance, is modulated.

BRIEF DESCRIPTION OF THE DRAWINGS

Other features and advantages of the invention will be apparent from the following description taken in connection with the drawings, wherein.

DEFINITIONS

As used herein:

Peak Amps Period equals the time period when the current is delivered at a peak level;

Base Amps Period equals the time period when the current is delivered at a base level;

Peak Amps Level means the current level during the Peak Amps Period;

Base Amps Level means the current level during the Base Amps Period;

Pulse Cycle means the time period extending from the beginning of one of the Peak Amps Periods to the end of the subsequent Base Amps Period;

Pulse Energy means the total energy delivered during one Peak Amps Period;

Average Current means a time average of current delivered, as calculated from the beginning of the present Pulse Cycle to the present time;

Arc Voltage means the instantaneous voltage measured across the gap;

Average Voltage means a time average of the arc voltage as calculated from the beginning of the present Pulse Cycle to the present time;

Proximity Distance means the distance between the torch head and the work; and

Various parameters are described as being "actual" values, "desired" values or nominal values. Actual values are values that are actually delivered by the power supply. Desired values are values that one desires to be delivered by the power supply. Nominal values are desired values, the value of which can change in real time during the welding operation as weld parameters change.

DETAILED DESCRIPTION OF THE INVENTION

Figure 1:
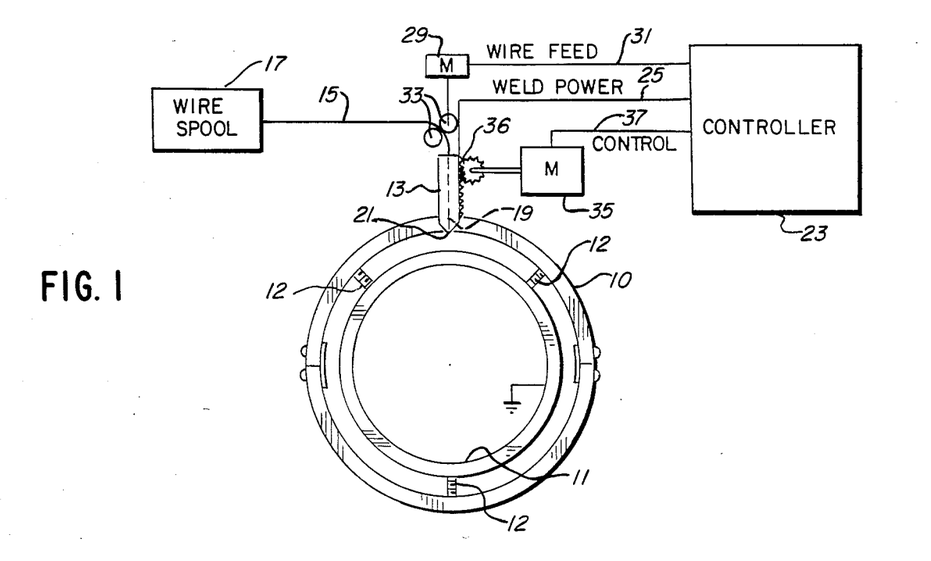
FIG. 1 is a block diagram of basic components making up the apparatus for carrying out the method of the invention.

Referring to FIG. 1, an apparatus for performing the invention is illustrated. A carriage 10 is mounted in spaced relation about a pipe 11 to be welded, wherein the spaced relation is maintained by three set screws 12. A torch head 13 rotates about the carriage 10. Depending upon the alignment of the carriage 10 and the set screws 12, the distance between the torch head 13 and the pipe 11 can vary as the torch head 13 moves about the circumference of the pipe 11. For a better understanding of rotating the torch head 13 about the pipe 11, see copending application, Ser. No. 908,029, filed Sept. 16, 1986, entitled "Mobile Robotic Platform".

The torch head receives a feed wire electrode 15 from a spool 17. The feed wire electrode 15 has an electrode tip 19. As is discussed in greater detail below, an arc is established across a gap 21 located between the electrode tip 19 and the pipe 11. A controller 23 delivers power to the feed wire electrode 15 and receives a feedback signal via a controller conductor 25.

A wire feed motor 29, receiving a wire feed control signal from the controller 23 via a wire feed control conductor 31 rotates wheels 33 to draw the feed wire electrode 15 from the wire spool 17 into the torch head 13. A proximity motor 35, in conjunction with a geared connection 36, rotates to move the torch head 13 radially relative to the pipe 11, thereby varying the proximity distance. The proximity motor 35 receives a proximity control signal from the controller via a proximity control signal conductor 37.

Current is delivered from the controller 23, along the controller conductor 25, into the torch head 13, along the feed wire electrode 15, across the gap 21, through the pipe 11 and ultimately to ground. The current crossing the gap 21 establishes an arc and an intense heat is generated by the arc. The heat causes the pipe 11 to melt locally in the vicinity of the arc, and further causes the feed wire electrode 15 to melt at the electrode tip 19. As the electrode tip 19 melts, molten metal is sprayed across the gap 21. The localized melting of the pipe 11 forms a puddle, and the molten metal is deposited on the puddle. The wire feed motor 29 rotates the wheels 33 in response to the wire feed control signal, causing additional of the feed wire electrode 15 to be drawn from the wire spool 17 to replenish that which has melted.

As indicated above, the present invention comprehends three modes of operation: the constant current/constant voltage/on-demand wire, or CC/CV/ODW mode; the constant voltage/constant wire/on-demand current, or CV/CW/ODC mode; and the constant voltage/constant current/on-demand wire, or CV/CC/ODW mode.

In each of the three modes, the current alternates between the peak amps level and the base amps level during each pulse cycle. The current is delivered at the peak level until a desired pulse energy has been delivered. Once the desired pulse energy has been delivered, the current is delivered at the base amps level. The length of time for which the current is delivered at the base amps level depends upon a controlling parameter. The controlling parameter depends upon the particular mode of operation selected.

In the CC/CV/ODW mode, the average current is the controlling parameter. When the current is delivered at the peak amps level, the actual average current is greater than the desired average current. When the energy delivered equals the desired pulse energy, the current is reduced to the base amps level, causing the actual average current to reduce. The base amps period continues until the actual average current equals the desired average current. At that time, a new pulse cycle begins and the current returns to the peak amps level. The actual feed rate of the feed wire electrode 15 deviates from the desired feed rate, assuming a value necessary to regulate the arc length and, thereby, maintain the desired average arc voltage.

In the CV/CW/ODC mode, the average voltage is the controlling parameter. When the current is delivered at the peak amps level, the wire burn-off rate is greater, and thus the arc length increases. An increased arc length results in an increased actual arc voltage. Therefore, during the peak amps period, the actual average arc voltage is greater than the desired average arc voltage. When the energy delivered equals the desired pulse energy, the current is reduced to the base amps level. The reduced current reduces the wire burn-off rate to near zero, decreasing the arc length, and thereby reducing the actual average arc voltage. The base amps period continues until the actual average arc voltage equals the desired average arc voltage. At that time, a new pulse cycle begins and the current returns to the peak amps level. The actual average current deviates from the desired average current, assuming a value necessary to melt the feed wire electrode 15 and maintain the desired average arc voltage.

In the CV/CC/ODW mode, the average arc voltage is the controlling parameter. As in the CV/CW/ODC mode, during the peak amps period, the actual average arc voltage is greater than the desired average arc voltage. When the energy delivered equals the desired pulse energy, the current is reduced to the base amps level. The base amps period continues until the actual average arc voltage equals the desired average arc voltage. The feed rate of the feed wire electrode 15 deviates from the desired feed rate, assuming a value necessary to regulate the arc length and, thereby, maintain the desired average current.

Figure 2A:
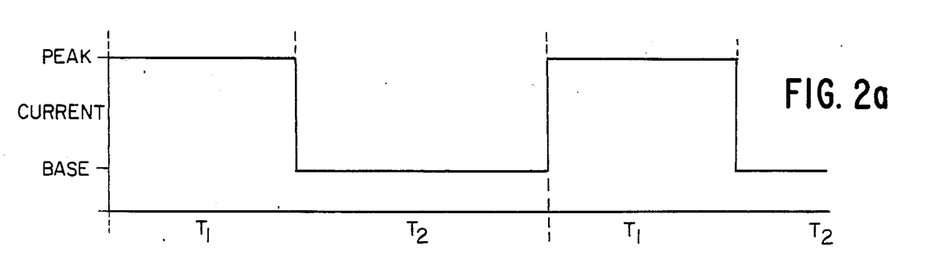
FIG. 2(a) is a graphic diagram illustrating intercycle energy output of the invention vs. time.
Figure 2B:
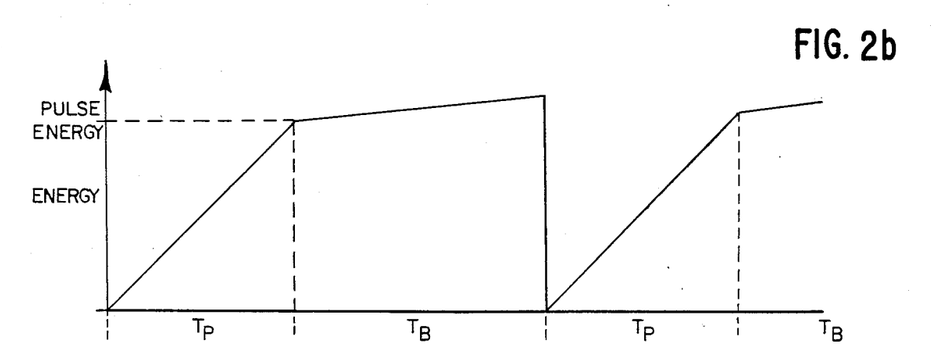
FIG. 2(b) is a graphic diagram illustrating current output of the invention vs. time.
Figure 2C:
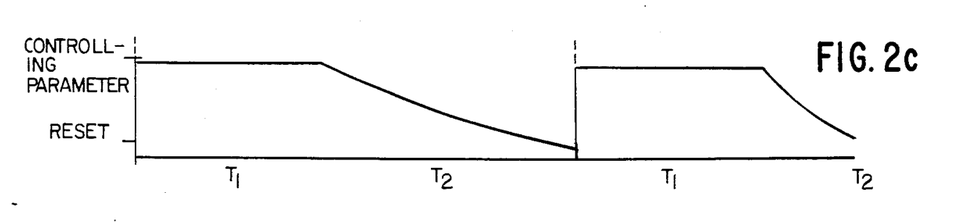
FIG. 2(c) is a graphic diagram illustrating an intercycle average level of a controlled parameter of the invention vs. time.

FIGS. 2a, 2b and 2c illustrate graphs of current level vs. time, pulse energy vs. time, and controlling parameter level vs. time, respectively.

Referring to FIG. 2(a), the current is alternately delivered at the peak amps level during the peak amps period ($T_p$) and at the base amps level during the base amps period ($T_b$).

As the current is delivered, energy is being delivered by the controller 23. Referring to FIG. 2(b), the total energy delivered by the controller 23 during a pulse cycle is illustrated. The pulse energy is represented by the area under the curve during the peak amps period. The rate at which the energy is delivered is greater during the peak amps period than during the base amps period because of the higher current level. Once the energy delivered equals the desired pulse energy, the base amps period begins.

FIG. 2(c) illustrates a controlling parameter controlling the length of time of the base amps period. As indicated above, the controlling parameter is the average current in the CC/CV/ODW mode and is the average arc voltage in the CV/CW/ODC and CV/CC/ODW modes. Once the actual level of the controlling parameter reduces to the desired level of the controlling parameter, the base amps period ends and a new pulse cycle is initiated.

As described above, each mode of operation also has a deviating parameter which can deviate from a desired value so that other parameters remain at their desired values. In the CC/CV/ODW mode, the deviating parameter is the feed rate of the feed wire electrode 15. In the CV/CW/ODC mode, the deviating parameter is the average current. In the CV/CC/ODW mode, the deviating parameter is the feed rate of the feed wire electrode 15.

As will be explained in greater detail below, the deviating parameter of each mode is returned to its desired level by moving the torch head 13 radially relative to the pipe.

Figure 3:
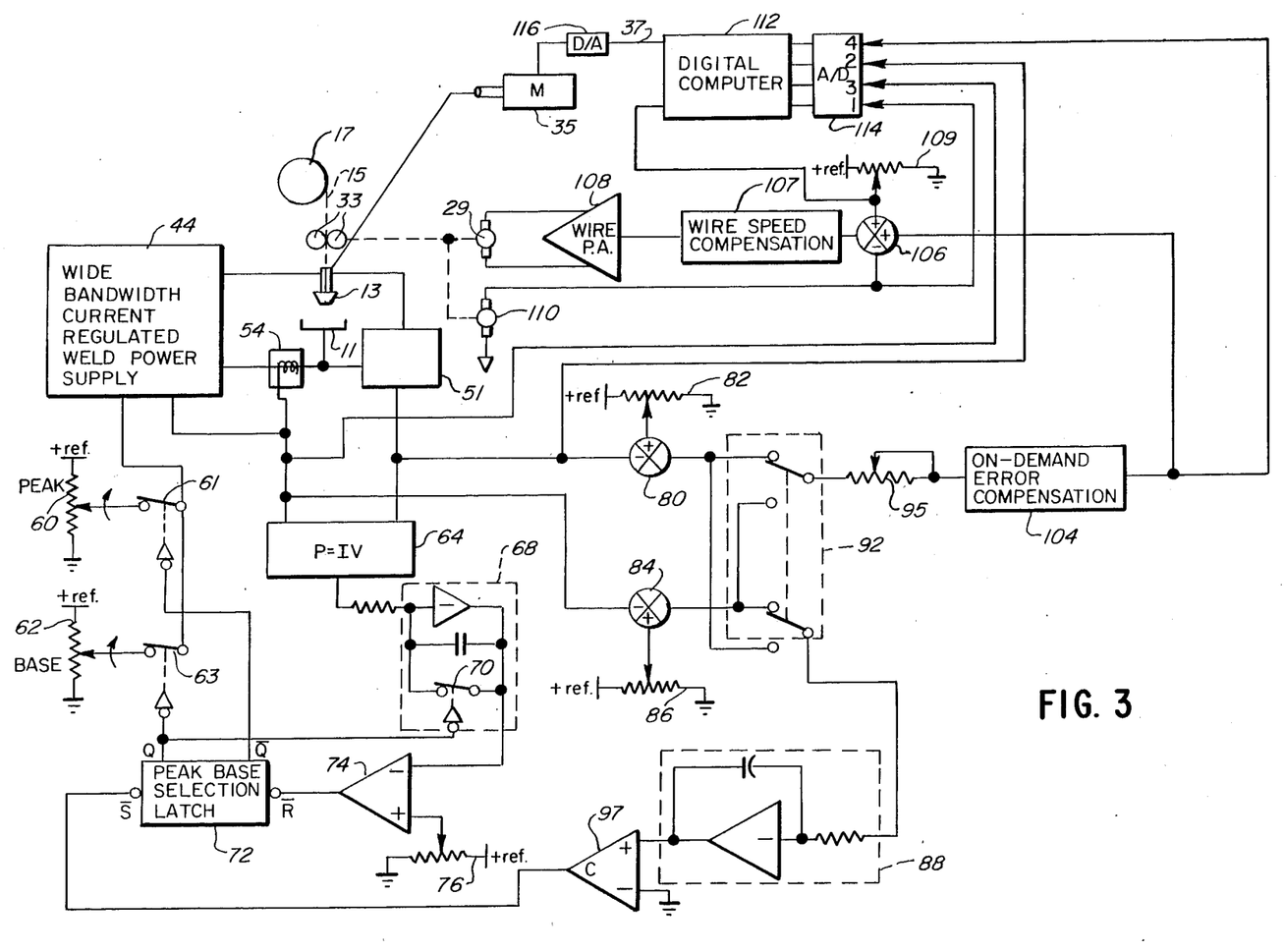
FIG. 3 is a schematic diagram of an electrical circuit for carrying out the invention.

Referring now to FIG. 3, a circuit located in the controller 23 (FIG. 1) for performing each of the three modes of operation is illustrated.

The circuit includes a power supply 44, which is a wide band width, pulse width modulated current regulator operable at 22 kHz. The power supply 44 has a positive output terminal coupled to a positive input terminal of the torch head 13 and a negative output terminal coupled to the pipe 11.

An arc voltage sensor 51 is coupled between the positive input terminal of the torch head 13 and the pipe 11. The arc voltage sensor 51 continuously measures the actual arc voltage between the feed wire electrode 15 and the pipe 11 and generates an arc voltage feedback signal at an arc voltage sensor output.

A current sensor 54 is coupled between the pipe 11 and the negative input terminal of the power supply 44. The current sensor 54 continuously measures the actual current delivered by the power supply 44 and generates a current feedback signal at a current sensor output. The power supply 44 further includes a current reference input which is alternatively connected to either a peak amps reference control 60 via a first normally closed, i.e., logic low closes switch, contact 61 or a base amps reference control 62 via a second normally closed contact 63.

An arc power multiplier 64 receives both the current feedback signal and the arc voltage feedback signal, multiplies their values, and generates a power feedback signal at an arc power multiplier output.

An inverting input to a pulse energy integrator 68, coupled to the output of the arc power multiplier 64, integrates the power feedback signal and generates an actual pulse energy signal. The pulse energy integrator 68 includes a third normally closed contact 70, operable in response to a selection latch 72. The selection latch is a typical S-R Flip-Flop, having an inverting SET input, an inverting RESET input, an output Q and an inverting output $\overline{Q}$. As will be discussed in greater detail below, the third normally closed contact 70 maintains the actual pulse energy signal at zero during the base amps period.

A first comparator 74 compares the actual pulse energy signal with a desired pulse energy signal generated by a pulse energy reference control 76. The first comparator 74 has an output which is coupled to the inverting RESET input of the selection latch 72. The output of the comparator 74 equals a logical high until the actual pulse energy signal equals the desired pulse energy signal, at which time the output of the comparator 74 will switch to a logical low.

A voltage summing junction 80 has a negative input coupled to the output of the arc voltage sensor 51 and a positive input coupled to an average arc volts reference control 82. The voltage summing junction 80 generates a voltage error signal representing the difference between the actual arc voltage and the desired average arc voltage.

A current summing junction 84 has a negative input coupled to the output of the current sensor 54 and a positive input coupled to a average current reference control 86. The current summing junction 84 generates a current error signal representing the difference between the actual current and the desired average current.

An averaging integrator 88 has an inverting input which is alternatively coupled to the output of either the current summing junction 84 or the voltage summing junction 80, depending upon the position of a mode switch 92. When the mode switch 92 is positioned as illustrated in FIG. 3, such that the inverting input to the averaging integrator 88 is coupled to the output of the current summing junction 84, the mode switch 92 is in a constant current position. Alternatively, when the mode switch 92 is positioned such that the inverting input to the averaging integrator output 88 is coupled to the output of the voltage summing junction 80, the mode switch 92 is in a constant voltage position. Additionally, when the mode switch 92 is in the constant current position, the output of the voltage summing junction 80 is coupled to an input of an on-demand gain control 95, and the on-demand gain control thereby receives the voltage error signal. Alternatively, when the mode switch 92 is in the constant voltage position, the output of the current summing junction 84 is coupled to the input of the on-demand gain control 95, and the on-demand gain control 95 thereby receives the current error signal.

The averaging integrator 88 has an output coupled to a second comparator 97. The second comparator 97 has an output coupled to the inverting SET input to the selection latch 72 and generates a logical high until the output of the averaging integrator 88 goes to zero.

The on-demand gain control 95 has an output coupled to an input of an on-demand error compensator 104, and the on-demand error compensator 104 has an output coupled to a first positive input of a wire speed summing junction 106. The wire speed summing junction 106 has a second positive input coupled to a wire approach speed control 109. Further, the wire speed summing junction 106 has a negative input coupled to an output of a tachometer 110 for receiving a wire feed motor speed feedback signal representing the speed of the wire feed motor 29.

An input to a wire speed compensator 107 is coupled to an output of the wire speed summing junction 106 and generates drive commands to maintain a zero speed differential between the sum of the wire approach speed signal, the on-demand error compensator signal and the wire feed motor feedback signal. A wire feed power amplifier 108 has an input coupled to an output of the wire speed compensator 107 and a power input of the wire feed motor 29. The wire feed amplifier translates low level drive commands generated by the wire speed compensator 107 into high power levels which are sufficient to drive the wire feed motor 29.

The circuit operates to adaptively modulate both the frequency and the duty cycle of the pulse cycle.

I. Pulse Cycle Regulation

Operation of the circuit in the three modes of operation is as follows. In each of the three modes, the operator of the device must set the peak amps control 60 to the desired peak amps level, the base amps control 62 to the desired base amps, the desired average volts control 82 to the desired average volts level, the desired average current control 86 to the desired average current level and the wire approach speed reference control 108 to the desired wire approach speed.

Depending upon various factors including the composition of the particular feed wire electrode 15, the power available and the material to be welded: the desired average current is set between 40-400 amps; the base current is set between 5 amps and the desired average current; the peak current is set between the desired average current and 600 amps; the pulse energy is set at 1 to 255 joules (watt-secs); and the frequency of the pulse cycle is resultingly between 40 Hz and 1 kHz.

A. Constant Current/Constant Voltage/On-Demand Wire Mode

Initially, the mode switch 92 is positioned to the constant current position. The selection latch 72 is set and the peak amps reference control 60 is coupled to the reference input of the power supply 44. The power supply 44 generates, by standard pulse width modulation techniques, a current equal to the peak amps level. The selection latch 72 further maintains the third normally open contact 70 in the open position. The arc power multiplier 64, in response to the current feedback signal and the arc voltage feedback signal, generates the power feedback signal representing the power presently generated by the power supply 44. With the third normally open contact 70, the pulse energy integrator 66 integrates the power feedback signal generating the actual pulse energy signal. Once the actual pulse energy signal equals the desired pulse energy signal, the output of the first comparator 74 switches to a logical zero, causing the selection latch 72 to reset. This opens the first normally open contact 61, disconnecting the peak amps control 60 from the current reference input to the power supply 44, closes the second normally open contact 63, connecting the base amps control 62 to the current reference input to the power supply 44, and initiates the base amps period. Further, the third normally open contact 70 closes driving the actual pulse energy signal to zero.

During the base amps period, current is generated by the power supply 44 at the base amps level.

The averaging integrator 88 receives the current error signal. During the peak amps period, the current error signal was positive because the current feedback signal is greater than the desired average current signal and the output of the averaging integrator was positive. However during the base amps period, the current error signal swings negative because the desired average current is greater than the base amps level. When the base amps period has continued sufficiently long, the output of the averaging integrator 88 will reach zero, causing the output of the second comparator 97 to switch to a logical low. This sets the selection latch 72, closing the third normally open contact 70, and connecting the peak amps reference control 60 to the input of the power supply 44.

The feed rate of the feed wire electrode 15 is set at a nominal value by the wire approach speed reference control 108. The wire speed summing junction 106 receives the wire approach reference speed control signal at its second positive input and the wire feed motor feedback signal at its negative input to maintain the feed rate at the nominal value. In addition, the wire speed summing junction 106 further receives an on-demand error compensation signal at its first positive input, the on-demand error compensator signal representing an error between the actual arc voltage and the desired average voltage. The on-demand error compensation signal causes the speed of the wire feed motor 29 to deviate from the nominal wire speed in order to maintain the arc voltage at the desired level. For example when the actual arc voltage is greater than the desired average arc voltage, the wire speed is increased, reducing the arc length, thereby reducing the actual arc voltage.

B. Constant Voltage/Constant Wire/On-Demand Current Mode

In the constant voltage/constant wire/on-demand current mode, the circuit works similarly to the above description relative to the CC/CV/ODW mode. However the mode switch 92 is set in the constant voltage mode. The averaging integrator 88 receives the voltage error signal, representing an error between the actual arc voltage and the desired arc voltage. Further the on-demand gain control 95 is set to zero, disabling the on-demand error compensator 104. The feed rate of the feed wire electrode 15 is maintained at the nominal setting of the wire approach speed control 109 and the average current is uncontrolled.

C. Constant Voltage/Constant Current/On-Demand Wire Mode

In the constant voltage/constant current/on-demand wire mode, the circuit operates similarly to the above description relative to the CV/CW/ODC mode. However the on-demand gain control 95 is set at a value other than zero, enabling the on-demand error compensator 104. The base amps period continues until the desired average arc volts equals the actual average arc volts and the feed rate of the feed wire electrode 15 deviates from the nominal setting to maintain the actual average current equal to the desired average current.

II. Proximity Control

As described above, operation in each of the above modes results in a deviating parameter. To cause the deviating parameter to return to its desired level, the circuit further includes a proximity control comprising a digital computer 112 having an analog to digital (A/D) converter 114 for converting analog signals to digital signals for subsequent use by the digital computer 112. The digital computer 112 controls the proximity motor 35 via a digital to analog (D/A) converter 116. The digital computer causes the proximity motor 35 to move the torch head 13 radially relative to the pipe 11.

A. Constant Current/Constant Voltage/On-Demand Wire Mode

In this mode, wherein the deviating parameter is the feed rate of the feed wire electrode 15, the actual arc voltage is regulated by adjusting the feed rate of the feed wire electrode 15. Therefore a relationship exists between the feed rate of the feed wire electrode 15 and the arc length. This relationship is also affected by other weld variables including:

(a) desired average amps;
(b) desired peak amps;
(c) desired base amps;
(d) desired pulse energy;
(e) shield gas composition;
(f) shield gas flow rate;
(g) shield gas ambient pressure;
(h) shield gas turbulence;
(i) filler wire composition;
(j) filler wire diameter;
(k) filler wire configuration;
(l) rate at which the torch head 13 moves about the circumference of the pipe 11;
(m) the weld puddle size, position and inertia;
(n) work material;
(o) joint configuration;
(p) temperature; and
(q) contact resistance of the contact tip.

Each of these variables directly influences the absolute value of the feed rate of the feed wire electrode 15. By maintaining these variables constant, the feed rate of the feed wire electrode 15 will also be maintained constant.

If the desired wire approach speed signal is set equal to the feed wire speed feedback signal, the output of the on-demand error compensator 104 will equal zero. Thus the digital computer 112 derives a nominal wire speed for existing arc conditions, and the nominal wire speed is utilized as the input to the second positive input to the wire speed summing junction 106. This drives the output of the on-demand error compensator 112 to zero, and the output will stay at zero unless one of the above weld variables changes or the proximity distance changes. If one of the above weld variables change, a new nominal wire speed is calculated. If the proximity distance is reduced, the actual arc voltage will be below the desired arc voltage, causing the feed rate of the feed wire electrode 15 to reduce. This reduction causes a negative voltage at the output of the on-demand error compensator 112, which is proportional to the reduced feed rate of the feed wire electrode 15. Similarly, an increase in the proximity distance increases the actual arc voltage, causing a positive voltage at the output of the on-demand error compensator 112, which is proportioned to the increased feed rate of the feed wire electrode 15. These voltages are utilized by the digital computer 112 to modulate the proximity distance, to return the feed rate of the feed wire electrode to the nominal value.

Figure 4:
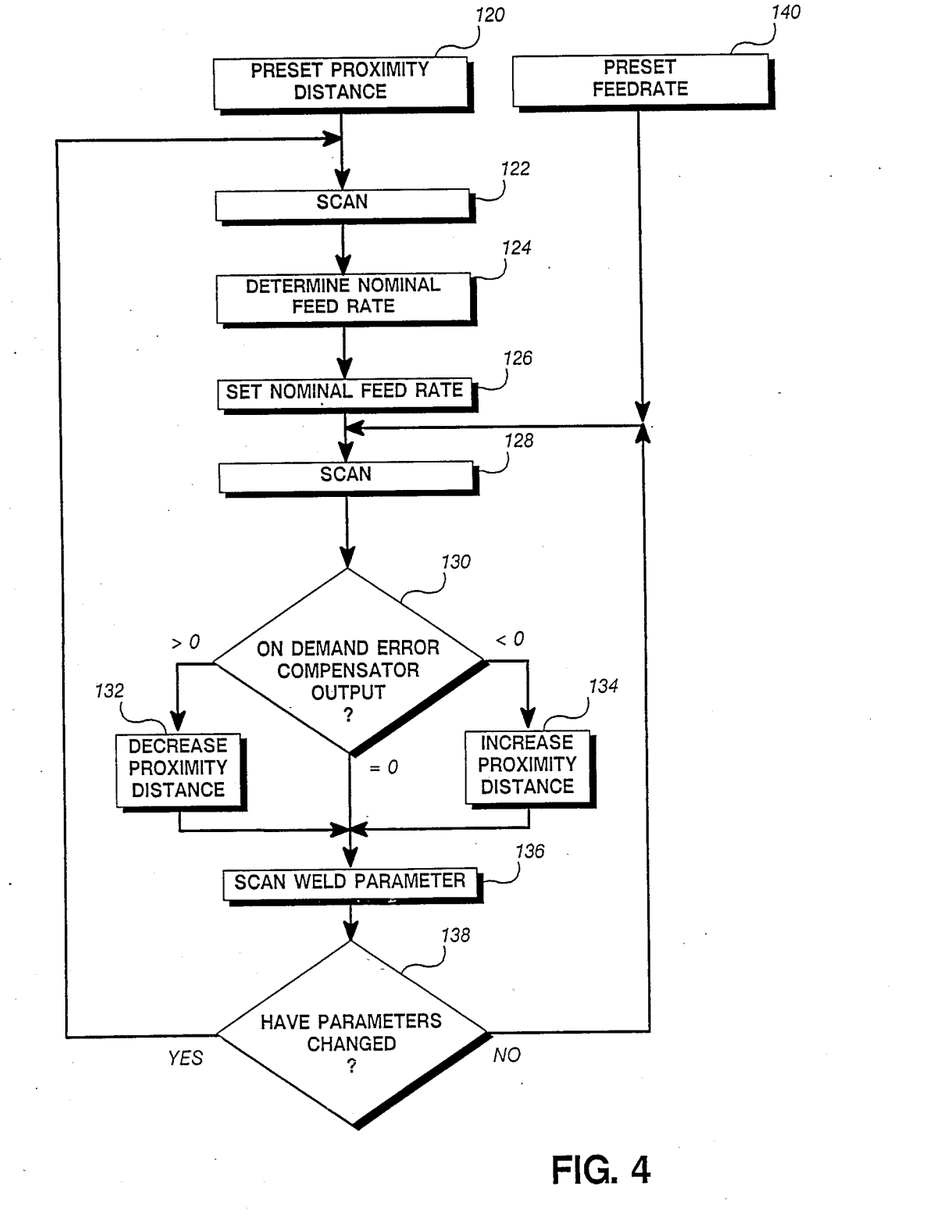
FIG. 4 is a flow chart illustrating a control program for performing two modes of the invention.

Referring now to FIG. 4, steps for performing proximity control in the CC/CV/ODW mode are illustrated in flow chart form.

At a block 120, the operator manually presets the proximity distance. The proximity distance must be preset to within 1/16" of the final proximity distance.

At a block 122, the digital computer 112 scans a first channel 123 to receive the wire speed feedback signal. At a block 124, the digital computer 112 determines a nominal feed rate. The digital computer 112 assumes that the proximity distance has been set to the correct value and samples the wire feed motor speed feedback signal eight times at a frequency of 100 milliseconds per sample to determine a nominal feed rate.

At a block 128, the digital computer 112 scans a second channel 129 to receive the on-demand error compensator signal, and at block 130, the digital computer 112 determines whether the on-demand error compensator signal is above zero, below zero, or equal to zero. If the on-demand error compensator signal equals zero, then the nominal feed rate is correct and no movement of the torch head 13 is required. If the on-demand error compensator signal is negative, indicating that for the present proximity distance, the nominal feed rate is too fast to maintain the actual arc voltage equal to the desired average arc voltage, the torch head 13 is incremented towards the pipe 11. Conversely, if the output is positive, indicating that for the present proximity distance, the nominal feed rate is too slow to maintain the actual arc voltage equal to the desired average arc voltage, the torch head 13 is incremented away from the pipe 11.

At a block 136, the digital computer 112 scans the weld variables. If none of the weld variables have changed since the previous scan of the weld parameters, the loop returns to the block 128, wherein the digital computer 112 again scans the second channel 129. However, in the event that the weld variables have changed, the loop returns to the block 122 wherein the digital computer 112 calculates a new nominal feed rate.

Alternatively to having the digital computer 112 determine the nominal feed rate, a "Production Mode" allows the operator to preset the nominal feed rate, as indicated by a block 140. In the Production Mode, while it is preferable to preset the proximity distance to within ¼" of the desired proximity distance, it can be set at up to three inches. However a proximity distance preset more than ¼" causes excess splatter of molten metal while the torch head 13 moves into position.

B. Constant Voltage/Constant Wire/On-Demand Current Mode

In the CV/CW/ODC mode, the deviating parameter is the average current.

Figure 5:
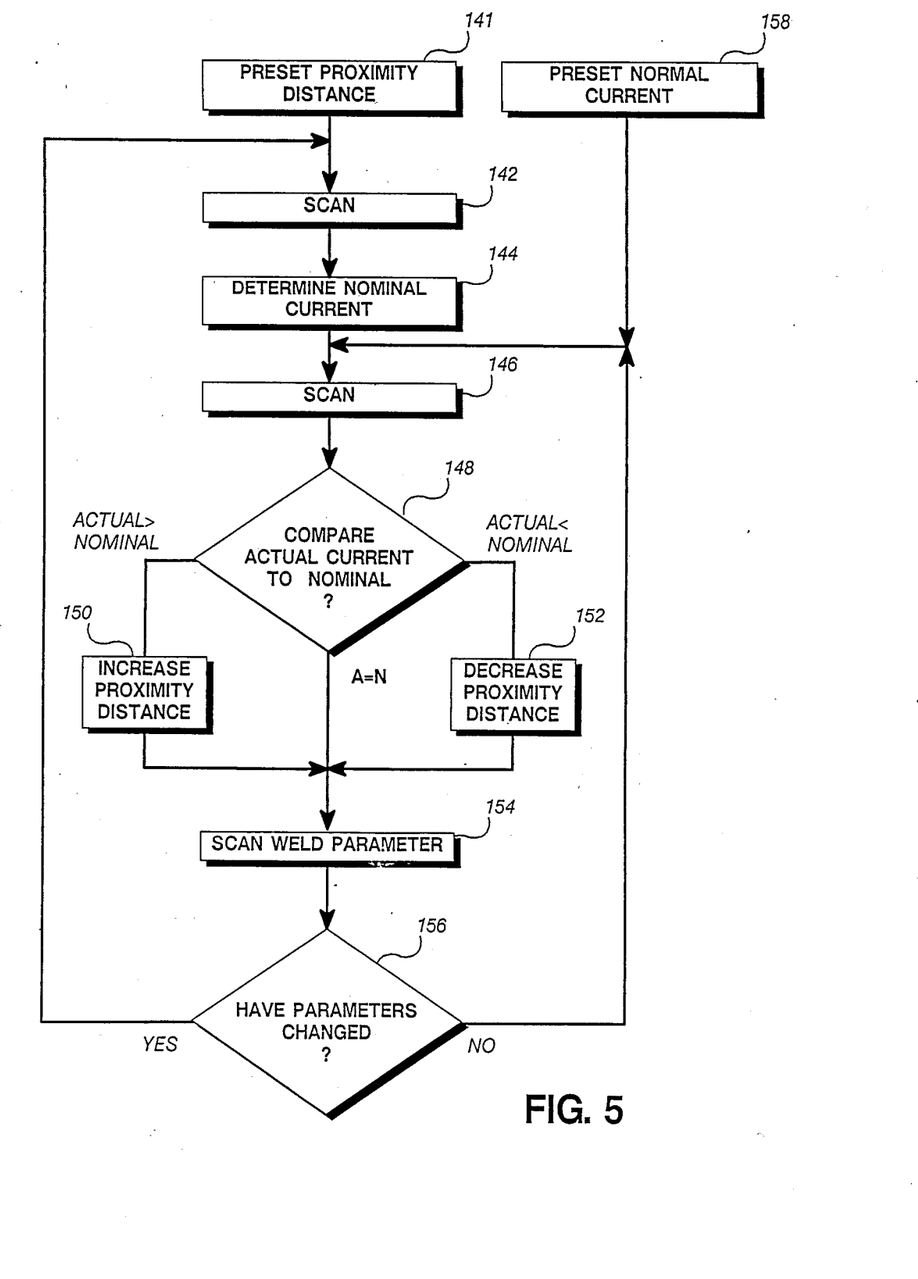
FIG. 5 is a flow chart illustrating a control program for performing a second mode of the invention.

Referring to FIG. 5, steps required for performing proximity control in the CV/CW/ODC mode are illustrated in flow chart form.

At a block 141, the operator first presets the proximity distance to within 1/16" of the desired position. At a block 142, the digital computer 112 scans a third channel 143 to receive the current feedback signal, and at a block 144, the digital computer 112 determines a nominal current by sampling the third channel 143 for eight samples at a rate of one sample per 100 milliseconds. The digital computer 112 again scans the third channel 143 and compares the actual current to the nominal current. If the actual current is greater than the nominal current, indicating that, for the present proximity distance, the current had to increase above the nominal value to maintain the actual arc voltage equal to the desired arc voltage, the torch head 13 is moved away from the pipe 11. Alternately if the nominal current is greater than the actual current, the torch head 13 is moved towards the pipe 11.

At a block 154, the digital computer 112 scans the weld variables. If the weld variables have changed, a new nominal current is determined. If the weld variables have not changed, the current feedback signal is again scanned and again compared to the determined current.

At a block 158, the operator can preset a nominal current, eliminating the requirement of initially presenting the proximity distance (block 141).

C. Constant Voltage/Constant Current/On-Demand Wire Mode

In the CV/CC/ODW mode, the proximity control operates as in the CC/CV/ODW mode, as illustrated in FIG. 4. The difference is that the on-demand error compensator signal represents the difference between the nominal wire speed and the wire speed necessary to maintain the actual current equal to the desired current at the new proximity distance.

We claim:

1. In an arc welding system having a torch head spaced from a work to be welded, said arc welding system for delivering power from a contact tip of a feed wire electrode carried by said torch head to said work wherein the power is cyclicly delivered at a high level during a high level portion of the cycle and at a low level during a low level portion of the cycle, the improvement comprising:
    means for delivering power at the high level until a desired pulse energy has been delivered; and
    means for delivering power at the low level until a recovery condition has been satisfied.

2. The improvement of claim 1 wherein the means for delivering the power at the high level until a pulse energy condition has been satisfied comprises:
    means for determining the energy delivered during the high level portion of the cycle; and
    means for terminating the high level portion of the cycle when a desired energy has been delivered.

3. In an arc welding system having a torch head spaced from a work to be welded, a feed wire electrode continuously delivered through said torch head towards said work, and a power supply for delivering power through said torch head and said feed wire electrode to said work, wherein the power is cyclicly delivered at a high level during a high level portion of the cycle and at a low level during a low level portion of the cycle, the improvement comprising:
    means for delivering power at the high level until a pulse energy condition has been satisified, said high level power delivering means including means for determining the energy delivered during the high level portion of the cycle and means for terminating the high level portion of the cycle when a desired energy has been delivered; and
    means for delivering power at the low level until a recovery condition has been satisfied, said low level power delivering means including means for determining an average current during the previous high level portion of the cycle and the present low level of the cycle and means for terminating the present low level of the cycle when the average current equals a desired value.

4. The improvement of claim 3 further comprising means for maintaining a constant voltage between the feed wire electrode and the work.

5. The improvement of claim 4 wherein the feed wire electrode is continuously fed towards the work and consumed by melting; and
    the means for maintaining a constant voltage between the wire electrode and the work comprises means for regulating the rate at which the feed wire electrode is fed.

6. The improvement of claim 5 wherein the feed rate of the feed wire electrode has a desired level and said arc welding power source includes means for adjusting the distance between the torch head and the work to maintain the feed rate of the feed wire electrode to the desired level.

7. In an arc welding system having a torch head spaced from a work to be welded, a feed wire electrode continuously delivered through said torch head towards said work, and a power supply for delivering power through said torch head and said feed wire electrode to said work, wherein the power is cyclicly delivered at a high level during a high level portion of the cycle and at a low level during a low level portion of the cycle, the improvement comprising:
    means for delivering power at the high level until a pulse energy condition has been satisfied, said high level power delivering means including means for determining the energy delivered during the high level portion of the cycle and means for terminating the high level portion of the cycle when a desired energy has been delivered; and
    means for delivering power at the low level until a recovery condition has been satisfied, said low level power delivering means including means for determining an average voltage during the previous high level portion of the cycle and the present low level of the cycle and means for terminating the present low level of the cycle when the average voltage equals a desired value.

8. The improvement of claim 7 including means for maintaining an average current.

9. The improvement of claim 8 wherein:
    the feed wire electrode is fed at a variable feed rate towards the work; and
    the means for maintaining the average current comprises means for regulating the feed rate of the feed wire electrode.

10. The improvement of claim 9 including means for adjusting the distance between the torch head and the work to maintain the feed rate of the feed wire electrode to a desired level.

11. The arc welding power source of claim 7 including means for maintaining a constant feed rate.

12. The improvement of claim 11 wherein:
    the current is delivered at variable levels; and
    the means for maintaining the average current comprises means for regulating the level of the current delivered.

13. The improvement of claim 12 including means for modulating the distance between the contact tip of the feed wire electrode and the work to maintain the current delivered to a desired level.

14. A proximity control for an arc welding system having a torch head spaced from a work to be welded, means for moving the torch head relative to said work, a feed wire electrode continuously delivered at a feed rate through said torch head towards said work, and a power supply for delivering power comprising a current at a voltage sequentially through the torch head and the feed wire electrode to said work, wherein the feed rate, the current and the voltage are mutually interdependent parameters each having desired values, the proximity control for regulating the distance of the torch head from the work comprising:
- means for delivering power to the work at either a regulated current or a regulated voltage;
- a first control loop for permitting one of said parameters to deviate from its desired level to maintain the parameter not controlled by the power delivery means at its desired level;
- means for determining the deviation of said one of said parameters from its desired value; and
- a second control loop responsive to said determining means for controlling said torch head moving means to adjust the distance of the torch head from the work and return said deviating parameter to its desired value.

15. The control of claim 14 wherein the deviating parameter is the feed rate of the feed wire electrode.

16. The control of claim 14 wherein the deviating parameter is the current.

17. A feed rate control for an arc welding system having a torch head spaced from a work to be welded, means for moving the torch head relative to said work, a feed wire electrode continuously delivered at a feed rate through said torch head towards said work, and a power supply for delivering power comprising a current at a voltage sequentially through the torch head and the feed wire electrode to said work, wherein the feed rate, the current and the voltage are mutually interdependent parameters each having desired values, the feed rate control for maintaining the feed rate at its desired value comprising:
- means for delivering power to the work at a regulated current;
- a first control loop for permitting said feed rate to deviate from its desired level to maintain the voltage at its desired level;
- means for determining the deviation of said feed rate from its desired value; and
- a second control loop responsive to said determining means for controlling said torch head moving means to adjust the distance of the torch head from the work and return said feed rate to its desired value.

18. A current control for an arc welding system having a torch head spaced from a work to be welded, means for moving the torch head relative to said work, a feed wire electrode continuously delivered at a feed rate through said torch head towards said work, and a power supply for delivering power comprising a current at a voltage sequentially through the torch head and the feed wire electrode to said work, wherein the feed rate, the current and the voltage are mutually interdependent parameters each having desired values, the current control for maintaining the current at its desired value comprising:
- means for delivering feed wire to the work at a regulated feed rate;
- a first control loop for permitting said current to deviate from its desired level to maintain the voltage at its desired level;
- means for determining the deviation of said current from its desired value; and
- means responsive to said determining means for controlling said torch head moving means to adjust the distance of the torch head from the work and return said current to its desired value.

* * * * *